US007668641B1

(12) United States Patent
Ludwig et al.

(10) Patent No.: US 7,668,641 B1
(45) Date of Patent: Feb. 23, 2010

(54) METHOD FOR CONTROL OF A TANK VENTILATION

(75) Inventors: Wolfgang Ludwig, Butzbach-Maibach (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 314 days.

(21) Appl. No.: 11/791,297

(22) PCT Filed: Oct. 27, 2005

(86) PCT No.: PCT/EP2005/055599

§ 371 (c)(1),
(2), (4) Date: May 22, 2007

(87) PCT Pub. No.: WO2006/056519

PCT Pub. Date: Jun. 1, 2006

(30) Foreign Application Priority Data

Nov. 26, 2004 (DE) ...................... 10 2004 057 210

(51) Int. Cl.

| | |
|---|---|
| ***B60T 7/12*** | (2006.01) |
| ***G05D 1/00*** | (2006.01) |
| ***G06F 7/00*** | (2006.01) |
| ***G06F 17/00*** | (2006.01) |
| ***F02D 41/00*** | (2006.01) |

(52) U.S. Cl. ........................ 701/104; 701/109; 123/698

(58) Field of Classification Search ................. 123/516, 123/674, 698; 701/104, 109; 60/285
See application file for complete search history.

(56) References Cited

U.S. PATENT DOCUMENTS

| | | | | | |
|---|---|---|---|---|---|
| 5,425,349 | A * | 6/1995 | Nagaishi et al. | 123/674 |
| 5,657,737 | A * | 8/1997 | Ishida et al. | 123/674 |
| 5,758,631 | A * | 6/1998 | Teraoka | 123/674 |
| 6,195,988 | B1 * | 3/2001 | Yasui et al. | 60/285 |
| 6,230,486 | B1 * | 5/2001 | Yasui et al. | 60/285 |
| 6,266,605 | B1 * | 7/2001 | Yasui et al. | 701/109 |
| 6,321,735 | B2 * | 11/2001 | Grieve et al. | 123/674 |
| 6,327,850 | B1 * | 12/2001 | Yasui et al. | 60/285 |
| 6,450,158 | B2 * | 9/2002 | Takahashi et al. | 123/681 |
| 6,666,198 | B2 * | 12/2003 | Mitsutani | 123/674 |
| 6,698,186 | B2 * | 3/2004 | Ueno et al. | 60/277 |
| 6,708,682 | B2 * | 3/2004 | Osanai | 123/698 |
| 6,736,120 | B2 * | 5/2004 | Surnilla | 123/674 |
| 7,370,642 | B2 * | 5/2008 | Amano et al. | 123/520 |
| 2001/0003982 | A1 | 6/2001 | Oki et al. | |
| 2003/0047161 | A1 | 3/2003 | Bagnasco et al. | |

FOREIGN PATENT DOCUMENTS

| | | | |
|---|---|---|---|
| DE | 199 36 166 | A1 | 2/2001 |
| EP | 0 637 685 | A1 | 2/1995 |
| EP | 1 253 311 | A2 | 10/2002 |

* cited by examiner

*Primary Examiner*—Stephen K Cronin
*Assistant Examiner*—David Hamaoui
(74) *Attorney, Agent, or Firm*—King & Spalding, L.L.P.

(57) ABSTRACT

There is described a method for determination of an application time for a tank ventilation on an internal combustion engine. An excessive enrichment of the air/fuel mixture can be avoided by means of a timely application of injection correction as result of the tank ventilation. According to said method, a threshold value comparison is carried out for a modified lambda control deviation, made up of the lambda control deviation and a pseudo lambda control deviation, whereby the pseudo lambda control deviation depends on the deviation of the lambda values from a given lambda set value.

12 Claims, 2 Drawing Sheets

METHOD FOR CONTROL OF A TANK VENTILATION

CROSS REFERENCE TO RELATED APPLICATIONS

This application is the US National Stage of International Application No. PCT/EP2005/055599, filed Oct. 27, 2005 and claims the benefit thereof. The International Application claims the benefits of German application No. 10 2004 057 210.0 DE filed Nov. 26, 2004, both of the applications are incorporated by reference herein in their entirety.

FIELD OF INVENTION

The present invention relates to a method for control of a tank ventilation in an internal combustion engine comprising a tank system which feeds gas via a ventilation valve from an activated carbon filter of a tank system to an intake tract of the internal combustion engine.

BACKGROUND OF INVENTION

Modern vehicles generally have a tank ventilation system which collects fuel vapors from the tank system in an activated carbon filter when the vehicle is parked. While the vehicle is operating, the activated carbon filter is regenerated, a valve of a line from the activated carbon filter to the suction pipe being opened by a defined amount so that air from the activated carbon filter enters the tank ventilation system and feeds the stored hydrocarbons to the intake air of the engine. This mixture that is additionally fed for combustion leads to a change in the overall composition of the mixture and the filling of the engine. This change can be countered by suitable control mechanisms or a suitable precontrol.

A known method measures the concentration of hydrocarbons in the tank ventilation gas flow and corrects the quantity of fuel introduced via the injection valves by the amount of the fuel quantity additionally introduced through the tank ventilation. This procedure is referred to below as injection correction by the tank ventilation. An important point in injection correction by tank ventilation is always the question of the point in time at which the injection correction should commence. This is explained briefly below:

If the valve is opened after a lengthy regeneration interruption or for the first time after the engine is started, the concentration of fuel vapors is not known, and a correction cannot be carried out. As soon as a measurable mixture deviation, i.e. a deviation between lambda actual value and lambda set value exists, estimation of the concentration can commence. However, at the time of the measurable mixture deviation at the lambda probe, a certain quantity of regenerating gas is already in the suction pipe, cylinders and exhaust tract.

The opening point of the valve, i.e. the point in time at which the valve is actuated for ventilation, and consequently a measurable deviation of the mixture arises, is subject to tolerances. The tolerances are so large that a reliable precontrol of the fuel correction that is based on a predetermined opening time of the valve is not possible. Also, the opening behavior of the valve can be non-linear; for example it is possible that the valves will open suddenly only upward of a certain signal strength in the control. The supply of the regenerating gas can therefore be dosed only poorly.

In the known methods, a significant enrichment of the mixture after opening of the tank ventilation valve was previously unavoidable, particularly in the idling range and at lower load levels.

In order to avoid sudden changing of the composition of the mixture, it was proposed that the enrichment be minimized by a slow opening of the valve. However, this prolongs the opening phase of the valve and enrichment of the mixture cannot fully be avoided due to the sudden behavior of the valve flap.

The technical object of the invention is to provide a method for tank ventilation which using simple means determines very reliably a suitable time and thus also a suitable quantity of fuel, depending on the operating status, for the commencement of an injection correction by the tank ventilation.

SUMMARY OF INVENTION

An object of the invention is achieved in a method comprising the features from claim 1. Advantageous embodiments form the subject matter of the sub-claims.

The method according to the invention for control of a tank ventilation in an internal combustion engine uses an injection correction. The injection correction takes into account a quantity of fuel fed, when the tank ventilation valve is open, from the tank system by means of the suction tract to the internal combustion engine. In order to determine correctly the time and the amount for the injection correction, a modified lambda control deviation is compared with a predetermined threshold value. The modified lambda control deviation calculated according to the invention is composed of the lambda control deviation and a pseudo lambda control deviation value which is formed from a deviation of lambda actual value and lambda set value. The lambda control value, also designated LR for short, can be represented for example as a percentage which indicates directly the extent to which the fuel quantity in the injection is to be reduced. The pseudo lambda control value not only takes into account the lambda control deviation but also takes into account the deviation of the lambda actual value from a lambda set value. By this means, an enrichment of the exhaust gas mixture due to a valve opening can be detected early, as a result of which an excessive enrichment is avoided.

In the determination of the pseudo lambda control deviation, an engine characteristics map is preferably provided which determines a multiplicative correction value depending on the difference between lambda set value and lambda actual value. The correction value is multiplied with a relative deviation of lambda actual value and a lambda set value. The product represents the pseudo lambda control deviation. The relative deviation of lambda actual value and lambda set value is preferably calculated as:

$$\text{Relative deviation}=1-(\text{lambda\_setvalue}/\text{lambda\_actualvalue}).$$

Depending on the representation of the lambda values, these can also be multiplied by 100 in order to take into account a corresponding percentage representation.

In a preferred development of the inventive method, the modified lambda control deviation is set to a start value if the difference between lambda actual value and lambda set value falls below a predetermined value. The start value corresponds to the value of the pseudo lambda control deviation before opening of the tank ventilation valve. In the case of small deviations, no value is thus determined for the pseudo lambda control deviation.

Likewise, the multiplicative correction value can increase the difference between lambda actual value and lambda set value if the difference exceeds a predetermined value. The approaches to shaping the characteristic value and the multiplicative correction value are based on the underlying idea that where deviations between lambda actual value and lambda set value are small, commencement of the injection correction should not be accelerated, whereas where the deviation of the lambda values is large, i.e. there is a significant enrichment of the mixture, an early injection correction should be carried out.

In order to balance deviations in the control of the injection quantity, the modified lambda control deviation is corrected by a zero value which corresponds to the modified lambda control deviation before opening of the valve. In the inventive method, it is thus geared to the relative change in the modified lambda control deviation after the opening of the valve.

The injection correction calculates when the threshold value is exceeded the current concentration of the proportion of fuel contained in the gas with the aid of the modified lambda control deviation. The methods for calculating the proportion of fuel are known in the art.

BRIEF DESCRIPTION OF THE DRAWINGS

The inventive method will be described in more detail below, in which.

DETAILED DESCRIPTION OF INVENTION

Figure 1:
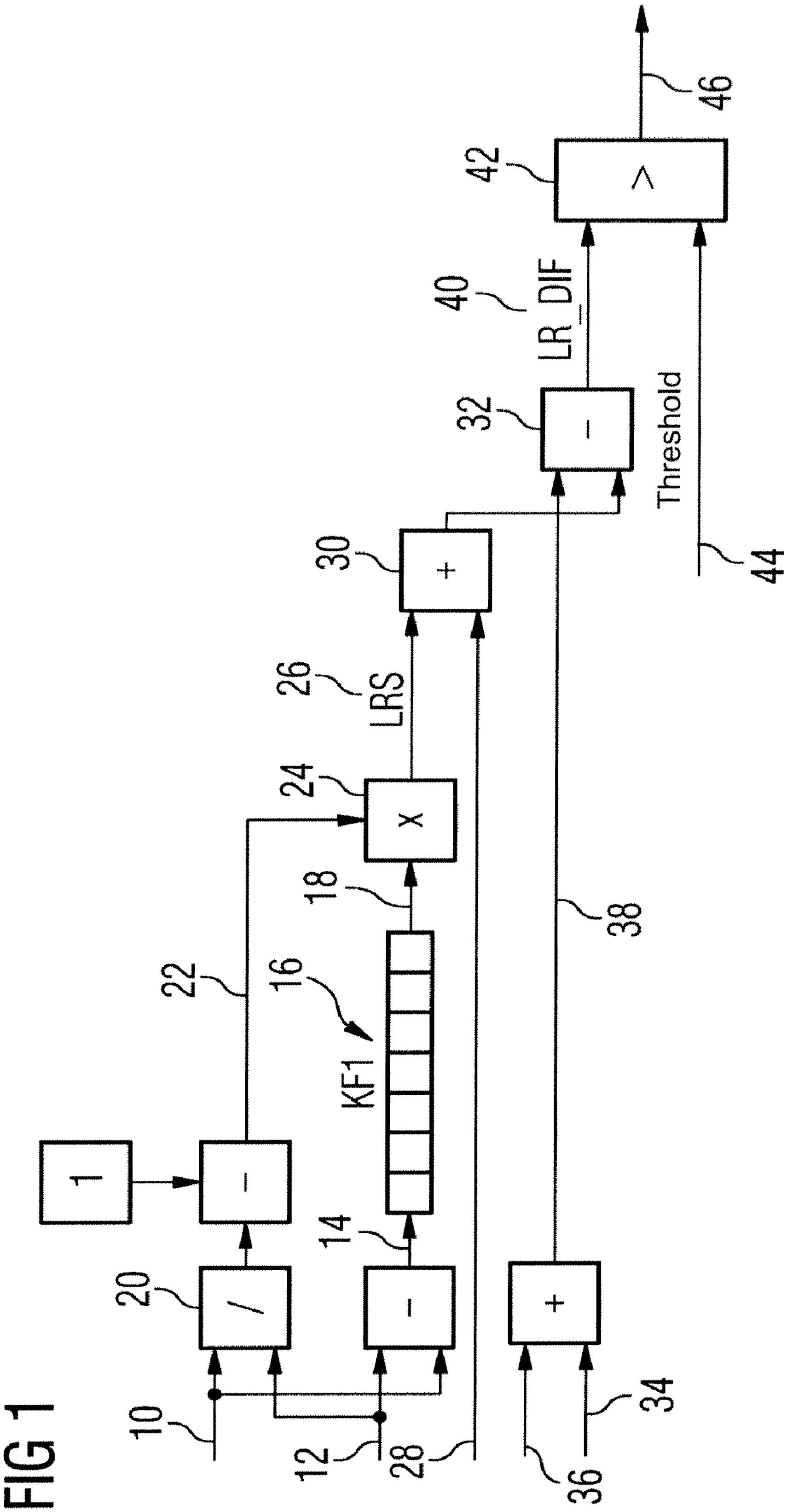
FIG. 1 shows a block diagram for evaluating the modified lambda control deviation and FIG. 2 shows the temporal development of the lambda values and of the control deviation in the method according to the invention.

FIG. 1 shows the triggering of the injection correction by the tank ventilation. Input variables are formed by the lambda actual value 10 and the lambda set value. The difference 14 between actual value 10 and set value 12, also designated the controlled variable, is converted via an engine characteristics map KF1 16 into a multiplicative correction factor 18. Likewise the quotient from lambda set value 12 and lambda actual value 10 is calculated in step 20. The quotient is subtracted from 1 so that a relative deviation 22 of lambda actual value and lambda set value is applied to the multiplier 24. The product of these variables is designated the pseudo lambda control deviation (LRS) 26. The qualitative course of the pseudo lambda control deviation can easily be illustrated. If lambda actual value and set value agree, then LRS has the value 0. Through the enrichment of the air/fuel mixture as a result of the opening of the valve, the deviation of actual value and set value becomes increasingly large. As well as the pseudo lambda control deviation 26, the inventive method also uses the control deviation 28 (LR). The control deviation of the lambda control indicates the extent to which the lambda control is intervening in the quantity of fuel being supplied. In step 30, pseudo lambda control deviation and lambda control deviation are added.

In step 32, the difference is formed with a sum variable 38 which is produced by adding a pseudo lambda control deviation 36 and a control deviation 34 before opening of the tank valve. The difference can be viewed as a normalized modified lambda control deviation (LR_DIF) 40. The variable LR_DIF is applied to a comparator 42 which compares the variables with a threshold value 44. If the variable exceeds the threshold value, then in 46 a triggering signal for the injection correction by the tank ventilation is triggered. The algorithm determining the concentration of fuel in the gas when carrying out the injection correction can preferably also use the variables LRS and LR_DIF.

Figure 2:
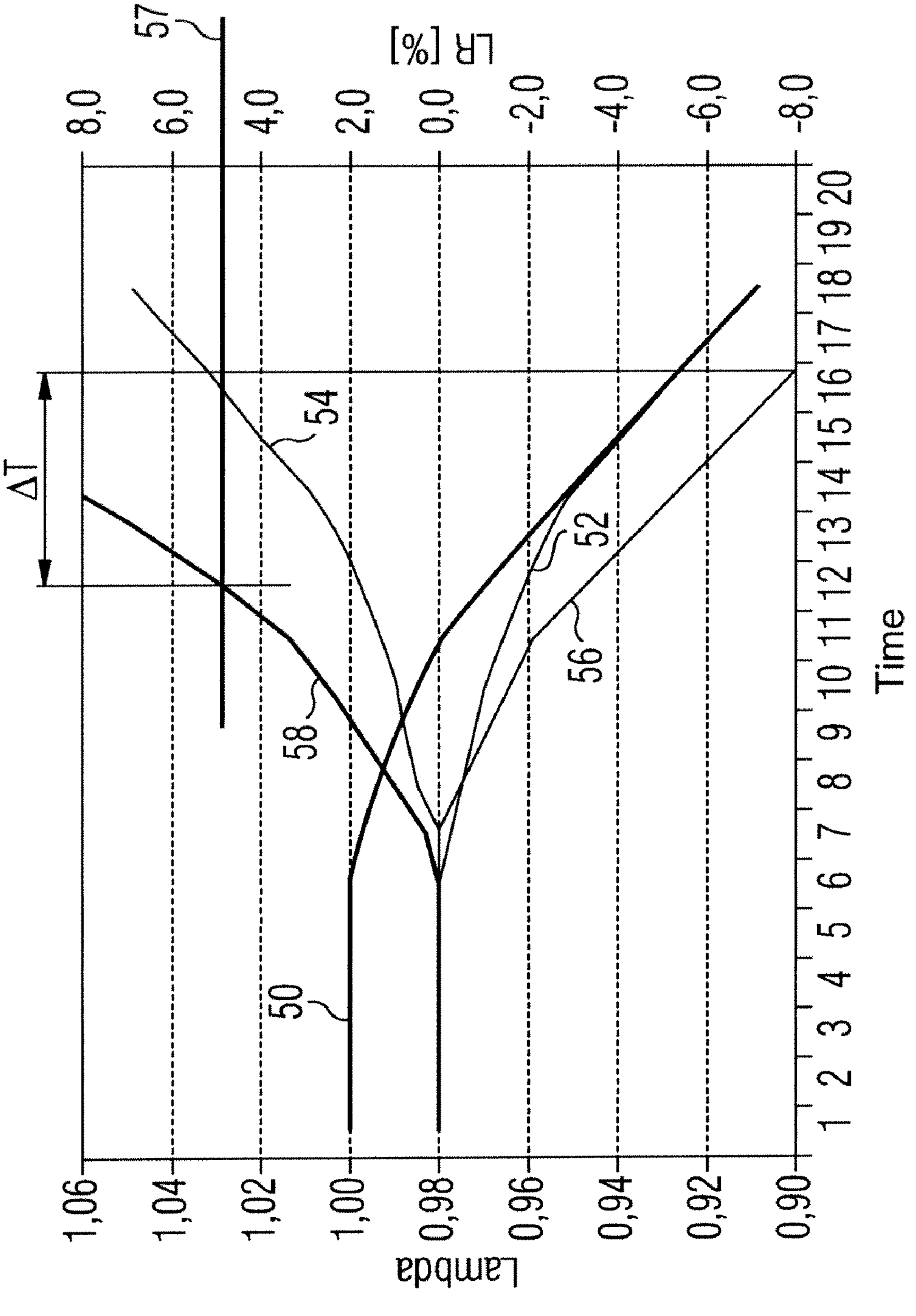

FIG. 2 shows the temporal course of the signals in the inventive method. 50 marks the course of the lambda actual value over time. It can clearly be seen that during the first time steps—approximately 1 to 6—a lambda value of 1 exists, whereby fluctuations in the lambda values, as occur for example as a result of forced excitation or for other reasons, are not shown. The measured lambda value 50 decreases as of time step 6 and leads to an enrichment of the air/fuel mixture. The control deviations and the pseudo control deviation are shown below the lambda values. All curves with the exception of the lambda values 50 are shown as a lambda control deviation LR relative to the right ordinate. With increasing enrichment of the air/fuel mixture, the lambda control deviation 52 diminishes increasingly. If the lambda control deviation 52 alone were used to determine the time of the correction, then the curve 54 would be produced relative to the amount of the lambda control deviation 52. With a threshold value 57 of 5%, a time of 17 is produced for the time for commencement of the injection correction. In this time, the lambda value has already fallen by 0.07. A significant enrichment has thus taken place. The pseudo lambda control deviation 56 described above is also shown in FIG. 2. With increasing deviation of the lambda values from the set value $\lambda=1$, the pseudo lambda control deviation 56 also increases. The modified lambda control deviation 58 is produced from the sum of the amounts of the curve 52 and 56. As can clearly be seen in FIG. 2, the curve 58 already cuts the threshold value 56 at a time of approximately 12, i.e. a time at which the lambda value has only decreased by approximately 0.025. The example shown in FIG. 2 thus shows how the time for commencement of the injection correction can be chosen significantly earlier using the inventive method.

If the variable 58 (LR_DIF) exceeds the threshold value 57, a series of steps are triggered:

According to methods already known a correction of the injection quantity is carried out, the current values of the regenerating gas concentration and regenerating gas quantity being used here, The lambda control value is shifted by the value of the relative control deviation ($LR_0$–LR) since the injection correction of the lambda control is taken over only by the injection correction due to the tank ventilation.

The calculation of the modified lambda control deviation (LRS) is blocked for the duration of the gas run time from the cylinders to the lambda probe and the value set to 0. The injection correction is then not updated again until after a dead time at the lambda probe.

The invention claimed is:

1. A method to control a tank ventilation of an internal combustion engine, comprising:

providing a tank system to feed gas via a ventilation valve from a tank container to an intake tract of the internal combustion engine;

providing a pseudo lambda control deviation based upon a deviation of a lambda actual value from a lambda set value and based upon an engine characteristic map;

providing a modified lambda control deviation based upon a lambda control deviation and the pseudo lambda control deviation; and applying an injection correction based upon a quantity of fuel fed with a gas if the modified lambda control deviation exceeds a predetermined threshold value.

2. The method as claimed in claim 1, wherein the tank container is an activated carbon filter of the tank system.

3. The method as claimed in claim 1, wherein a multiplicative correction value is determined via the engine characteristics map from a difference of the lambda set value and the lambda actual value.

4. The method as claimed in claim 3, wherein the multiplicative correction value is multiplied with a relative deviation of lambda actual value and lambda set value.

5. The method as claimed in claim 4, wherein the pseudo lambda control deviation is determined based upon the multiplication.

6. The method as claimed in claim 5, wherein the relative deviation of lambda actual value and lambda set value is calculated as follows:

Relative deviation=1−(lambda set value)/(lambda actual value).

7. The method as claimed in claim 1, wherein the pseudo lambda control deviation is set to a start value, if a difference between the lambda actual value and the lambda set value falls below a first predetermined value.

8. The method as claimed in claim 7, wherein the multiplicative correction value increases the difference between the lambda actual value and the lambda set value if the difference exceeds a second predetermined value.

9. The method as claimed in claim 8, wherein the modified lambda control deviation is corrected by a zero value, wherein the zero value corresponds to the modified lambda control deviation before an opening of the ventilation valve.

10. The method as claimed in claim 1, wherein the injection correction determines an actual concentration value of a proportion of fuel contained in the gas based upon the modified lambda control deviation.

11. The method as claimed in claim 10, wherein the injection correction is based on the current concentration for the injection correction if the threshold value is exceeded.

12. The method as claimed in claim 11, wherein the lambda actual value is temporally smoothed.

* * * * *